Patented May 26, 1936

2,042,411

UNITED STATES PATENT OFFICE 2,042,411

PROCESS OF DECOMPOSING FATS OR OILS INTO FATTY ACIDS AND GLYCERINE

Joseph O. Peirce, Cincinnati, Ohio, assignor to Kay-Fries Chemicals, Inc., West Haverstraw, N. Y., a corporation of New York No Drawing. Application January 21, 1935, Serial No. 2,750

10 Claims. (Cl. 87—4)

This invention relates to the production of soap and particularly to the step thereof in which the oils, fats or waxes are hydrolyzed to produce fatty acids and glycerine.

The reaction by means of which oils, fats and the like have been hydrolyzed has been known for a long time and various methods, including the use of pressure, acids, catalysts and the like, have been proposed. One of the well known methods is that of the Twitchell process disclosed in early U. S. patents of Ernst Twitchell as, for example, 601,603, of 1898; 628,503, of 1899; 1,082,662, of 1913; as well as modifications thereof by other inventors in more recent patents. These processes comprise, broadly, heating the oil or fat in the presence of a substantial amount of water which furnishes the water of hydrolysis and to assist in the reaction of the water with the oil or fat a catalyst is added. The exact mechanism of the reaction has not been absolutely determined, although a number of explanations have been given, most of which depend upon the surface tension depressing action of the catalyst in permitting or assisting in intimate contact of the oil or fat with the water.

One of Twitchell's early suggestions of a material suitable for use in catalyzing these reactions was sulfonated oleic acid and based upon this general idea various other sulfonated compounds have been prepared and used as fat splitting catalysts. For the most part the fat splitting catalysts were produced by the sulfonation of oils containing carboxylic acid groups although more recent developments have suggested the use of other types of sulfonated compounds. The commercial catalysts used in fat splitting reactions, when produced from common sources of sulfonates, are usually quite dark colored and impart this discoloration to the fatty acids and glycerine produced. Furthermore, the fat splitting catalysts now used for the commercial reactions, where a high degree of purity in the final product is not necessary, are produced from sources and materials which are of non-uniform character and as a result of which the fat splitting catalysts produced vary in properties, so that a soap manufacturer has to alter his operation conditions for practically every new batch of fat splitter that is used.

In this invention it is one of the primary objects to provide a process for splitting fats by means of which a high yield of commercially pure products can be secured. Another object is to provide a process of fat splitting in which a catalyst is employed of a type that can be readily manufactured from controlled sources of raw materials to produce catalysts of uniform properties so that a given set of control conditions may be used with every batch of the same type of material. These and other objects, which will be apparent from the sequent description, are all embraced within this invention, which will now be described with reference to a preferred embodiment thereof.

In copending application Serial No. 2,749 filed January 21, 1935, there is disclosed and claimed products comprising sulfonic acid bodies that possess a high degree of catalytic action for the splitting of fats into fatty acids and glycerine.

As described more in detail in the above identified application, the fat splitting catalysts may be produced by the sulfonation and polymerization of selected hydrocarbons or mineral oil derivatives. Among the suitable types of mineral oil derivatives therein disclosed and which when treated according to the teachings of that application produces a particularly efficient fat splitting catalyst is an oxidized kerosene prepared, for example, by the catalytic partial oxidation of kerosene. Such catalytically partially oxidized kerosene, having a high degree of unsaturation and solubility in sulfuric acid with preferably a limited amount of chemically combined oxygen, is subjected to a sulfonation and polymerization or condensation treatment.

The sulfonation is accomplished by the addition of approximately an equal amount of 95% concentrated sulfuric acid to the oxidized oil or a distillate thereof in which the still residue containing discoloring impurities is discarded. While concentrated sulfuric acid has been found to be preferable, it is possible to use a less concentrated acid or, if desired, a fuming acid, in the former case a larger amount being necessary than in the latter case. The acid may be added to the oxidized oil under agitation in several steps to prevent or avoid undue rise in temperature and/or gasing. It is preferable to maintain a temperature during the addition of the acid between about 30 and 55° C., although higher temperatures may be permitted especially if the reaction is carried out in a closed vessel. When all of the acid has been added to the oxidized oil, the agitation which was maintained during the addition of the acid is continued and the reaction mass subjected to a treatment for polymerization or condensation by maintaining the reaction mass at elevated temperatures for an extended period of time. In the case of oxidized kerosene, six hours at 65° C. proved adequate, although temperatures from 70 to 90° C. for from four to twelve hours or more may also be employed. It will be appreciated, of course, that the factors of concentration of acid, temperature of treatment and time of treatment are interrelated and may be varied within rather wide limits. If the sulfonation reaction is conducted only as such without the polymerization and condensation treatment, the sulfonic acid bodies produced while surface tension depressants have no fat splitting catalytic properties, but by the polymerization and condensation reaction accomplished by extended treatment at elevated temperatures, the property in question is imparted to the product.

Upon the completion of the sulfonation and the polymerization or condensation reactions, the agitation of the material is discontinued and stratification occurs, in which two layers are formed, an upper layer of top oil or unreacted hydrocarbon, the relative amount of which is dependent upon the reactivity of the unsaturated hydrocarbon used as the starting material. The lower layer comprises the sulfonated and polymerized bodies, some residual sulfuric acid, and it may, after separation from the top oil, be washed with a small amount of water to separate out some of the acid, or the washing step may be applied to the material prior to stratification. In either event the water containing the sulfuric acid and some water soluble constituents separates as a bottom layer, which is withdrawn. The layer containing the sulfonated and polymerized bodies is then recovered for use as a fat splitting catalyst. If desired, the residual sulfuric acid may be neutralized by treating the polymerized sulfonic acid bodies with ammonia which, if added in sufficient quantities, also forms salts with the sulfonic acids. Other alkalis than ammonia may, of course, be substituted.

The polymerized sulfonic acid bodies produced in the manner above described cannot definitely be analyzed to identify their chemical structure except that broadly they appear to be polymerized and condensed aliphatic (or naphthenic depending upon the source of the oil) sulphonic acid compounds with the sulfonic acid in a position protected against hydrolysis. The protected position is apparently dependent upon the polymerization or condensation treatment, since when this treatment is omitted the sulfonic acids are readily hydrolyzed and, for this reason, among others, are unsuitable as fat splitting catalysts. The sulfonic acid bodies as such form milky emulsions with great difficulty in boiling water and those having the highest degree of catalytic action for fat splitting are relatively dark in color and very viscous. The alkali metal salts of the sulfonic acid bodies are soluble in water, but if an alkali earth metal salt is added the sulfonic acid bodies are precipitated.

The foregoing description of the method of preparing a fat splitting catalyst is only one of the many disclosed in the above identified application, all of which possess fat splitting catalytic properties and are to be considered as embraced within this disclosure.

The products produced according to the invention described in the copending application and referred to above are surface tension depressants and fat splitting catalysts. They are stable in the presence of hot dilute mineral acids and produce high yields of fatty acids when employed as catalysts. One method of splitting oils, fats or waxes to produce fatty acids and glycerine is as follows: 100 parts of fat, for example, tallow, is melted with about 30 parts of water to which is added 1 part of polymerized sulfonated hydrocarbon of the type described above and 1 part of about 60° Bé. sulfuric acid. This mixture is heated by bubbling steam therethrough for approximately eighteen hours, during which time about 85% total decomposition occurs. The material is then permitted to stratify, as a result of which the fatty acid and undecomposed oil forms a top layer with the water, glycerine and sulfuric acid forming a lower layer that is withdrawn. To the oil and fatty acid an additional amount of water, that is, approximately 20 parts, and about one-half part of 60° Bé. sulfuric acid is added and desirably, although it is not essential, one-half part of additional catalyst; then steam is introduced for about an additional eight hours, as a result of which over 97% total decomposition is accomplished. Apparently it is the hydrogen ion concentration that is a controlling factor in the reaction and it has been found that substantially any mineral acid, for instance, hydrochloric acid or phosphoric acid may be used in such quantities as will produce an equivalent hydrogen ion concentration. The mixture is then permitted to stratify, the water, acid and glycerine being drawn off from the lower layer to be treated for recovery of the glycerine, while the fatty acid is removed for treatment in the usual manner to form soaps or other products.

The foregoing example illustrates a preferred method of fat splitting employing the catalysts of the instant invention, but it will be appreciated that various modifications may be made in this process with reference to the relative proportion of the ingredients such as the amount of water, catalyst or acid added, as well as the time and temperature of the two boils. The amount of catalyst may be as small as .5% of the oil or fat treated.

Although the invention has been described with reference to preferred embodiments thereof, these are to be considered only as illustrative and not as a limitation of the invention, which is to be limited only in the light of the prior art and the appended claims.

I claim:

1. The process for decomposing oils and fats to produce fatty acids and glycerine which comprises hydrolyzing said oils and fats with water in the presence of a small amount of a fat splitting catalyst including a sulfonated hydrocarbon polymerized by subjecting the sulfonation products to an elevated temperature treatment for several hours.

2. The process for decomposing oils ond fats to produce fatty acids and glycerine which comprises hydrolyzing said oils and fats with water in the presence of a partially oxidized hydrocarbon, sulfonated and polymerized by subjecting the sulfonation products to an elevated temperature treatment for several hours.

3. The process for decomposing oils and fats to produce fatty acids and glycerine which comprises hydrolyzing said oils and fats with water in the presence of a small amount of a fat splitting catalyst including a dehydrogenated hydrocarbon, sulfonated and polymerized by subjecting the sulfonation products to an elevated temperature treatment for several hours.

4. The process for decomposing oils and fats to produce fatty acids and glycerine which comprises hydrolyzing said oils and fats with water in the presence of a small amount of a fat splitting catalyst including an unsaturated hydrocarbon, sulfonated and polymerized by subjecting the sulfonation products to an elevated temperature treatment for several hours.

5. The process for decomposing oils and fats to produce fatty acids and glycerine which comprises hydrolyzing said oils and fats with water in the presence of a small amount of a fat splitting catalyst including a substantially fatty acid free hydrocarbon, sulfonated and polymerized by subjecting the sulfonation products to an elevated temperature treatment for several hours.

6. The process for decomposing oils and fats to produce fatty acids and glycerine which comprises hydrolyzing said oils and fats with water in the presence of a small amount of a fat splitting catalyst including sulfonated bodies from catalytically oxidized petroleum fractions polymerized by subjecting the sulfonation products to an elevated temperature treatment for several hours.

7. The process for decomposing oils and fats to produce fatty acids and glycerine which comprises hydrolyzing said oils and fats with water in the presence of a small amount of a fat splitting catalyst including catalytically partially oxidized hydrocarbon, sulfonated and polymerized by subjecting the sulfonation products to an elevated temperature treatment for several hours.

8. The process for decomposing oils and fats to produce fatty acids and glycerine which comprises hydrolyzing said oils and fats with water in the presence of a small amount of a fat splitting catalyst including catalytically partially oxidized kerosene, sulfonated and polymerized by subjecting the sulfonation products to an elevated temperature treatment for several hours.

9. The process for decomposing oils and fats to produce fatty acids and glycerine which comprises hydrolyzing said oils and fats with water in the presence of a small amount of a fat splitting catalyst including catalytically partially oxidized kerosene, sulfonated and polymerized by subjecting the sulfonation products to a temperature of about 65° C. for about six hours.

10. The process for decomposing oils and fats to produce fatty acids and glycerine which comprises hydrolyzing said oils and fats with water in the presence of a small amount of a fat splitting catalyst including sulfonated bodies from catalytically oxidized petroleum fractions polymerized by subjecting the sulfonation products to a temperature of between 65° C. to 90° C. for from four to twelve hours.

JOSEPH O. PEIRCE.